May 30, 1933.                W. D LIPPS                1,911,835
                       MACHINE FOR MAKING BRUSHES
                  Original Filed Jan. 8, 1932     7 Sheets-Sheet 1

May 30, 1933.  W. D. LIPPS  1,911,835

MACHINE FOR MAKING BRUSHES

Original Filed Jan. 8, 1932   7 Sheets-Sheet 5

Inventor
William D. Lipps
by his Attorney
John R. Nolan

May 30, 1933.    W. D. LIPPS    1,911,835
MACHINE FOR MAKING BRUSHES
Original Filed Jan. 8, 1932    7 Sheets-Sheet 7

Patented May 30, 1933

1,911,835

UNITED STATES PATENT OFFICE

WILLIAM D. LIPPS, OF FREDERICK, MARYLAND, ASSIGNOR TO OX FIBRE BRUSH COMPANY, INC., OF NEW YORK, N. Y., A CORPORATION OF DELAWARE

MACHINE FOR MAKING BRUSHES

Original application filed January 8, 1932, Serial No. 585,441. Divided and this application filed July 1, 1932. Serial No. 620,461.

This is a division of my co-pending application Serial No. 585,441, filed January 8, 1932 (Patent No. 1,888,352, dated November 22, 1932), for Machines for making brushes, more particularly brushes in which the bristles or fibres are associated with and supported by longitudinal core wires.

The present invention concerns simple and efficient means for supporting and twisting the core wires, comprising co-operatively related main and supplemental twisting mechanisms, whereof the main mechanism is adapted and arranged to twist a plurality of wires longitudinally upon an interposed layer of bristles or fibres in such manner that a cylindrical brush body having untwisted wire extensions at the respective ends thereof is produced, and whereof the supplemental mechanism is adapted and arranged subsequently to receive the extremities of the wires and tightly twist the untwisted end extensions.

The invention also comprises means for simultaneously or independently actuating the said twisting mechanisms and for automatically stopping the operation of either of said mechanisms upon the completion of its twisting operation independently of the other mechanism.

The invention also comprises features of novelty and combinations of parts which, in a preferred form, will be hereinafter described; the scope of the invention then being defined in the appended claims.

Referring to the drawings, A designates a part of the main supporting frame of a brush making machine, and 30 designates a horizontal drive shaft which has its bearings in brackets 31 on the main frame, and is provided with a pulley 32 which is belted with and driven from a suitable source of power.

168 and 169 designate a pair of spaced-apart grippers constructed and arranged to receive a pair of stout core wires (W) and support them in parallelism and in embracing relation to a layer of bristles or fibres (B). Mechanism for assembling the bristles or fibres and for associating them with the core wires is set out in the pending application Serial No. 585,441 aforesaid.

Each of the wire grippers 168, 169 comprises a base plate 170 having at its inner end a pair of complementary flared jaws whereof one (171) is fixed and the other (172) is movable in a guide on the base plate. The movable jaw is connected to one arm of a lever 173' which is fulcrumed on the base plate.

The other arm of the lever is connected to a crank arm 174' fast on a cam head 175' having a projecting arm 176', which cam head co-acts with an adjacent stop 177 on the base whereby when the arm 176' is properly manipulated the movable jaw can be closed and locked to grip the wire, or be unlocked to release the wire. The arm 176' of the cam head for the movable jaw of the gripper 169 is preferably connected by means of a link 178 with a sliding sleeve 179 splined on a horizontal hollow spindle 180 projecting from the base plate of the gripper 169. This sleeve is operatively connected to a hand lever 181 which is fulcrumed at 182 on a suitably-disposed bracket 183 on the main frame, whereby when the handle is properly moved the cam head is operated to close or open the movable jaw of the gripper 169.

The horizontal hollow spindle 180 has its bearings in spaced brackets 191 on the main frame. On the spindle is a gear 192 between which and the spindle is a suitable clutch L hereinafter described by means of which the gear can be rendered fast or loose on the spindle. This gear meshes with a pinion 193 fast on a lower parallel shaft 194 having its bearings in the brackets 191, which shaft bears a pulley 294 that is connected with and continuously driven from a pulley 195 on the main shaft 30 by means of a belt 196. (See Figs. 1, 4, 5, 6 and 7.)

Figure 1:
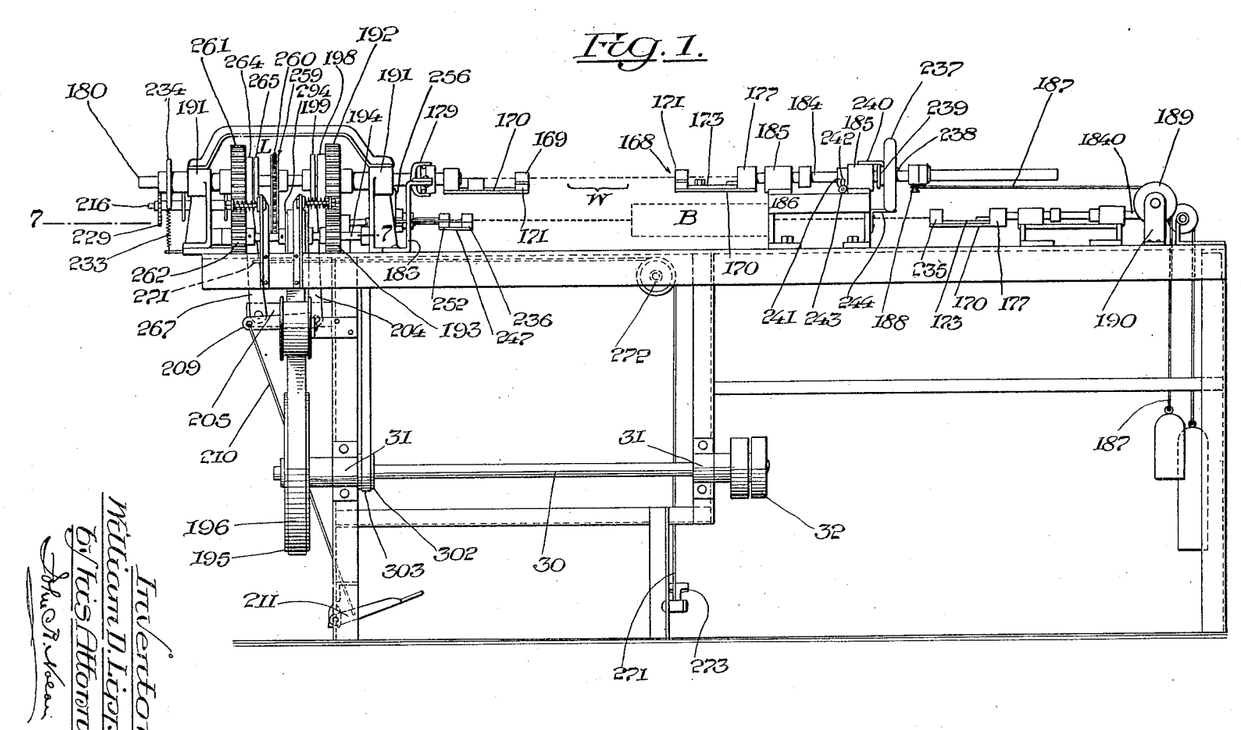
Figure 1 is a rear elevation of a part of a brush making machine equipped with corewire twisting mechanisms embodying my improvements.
Figure 2:
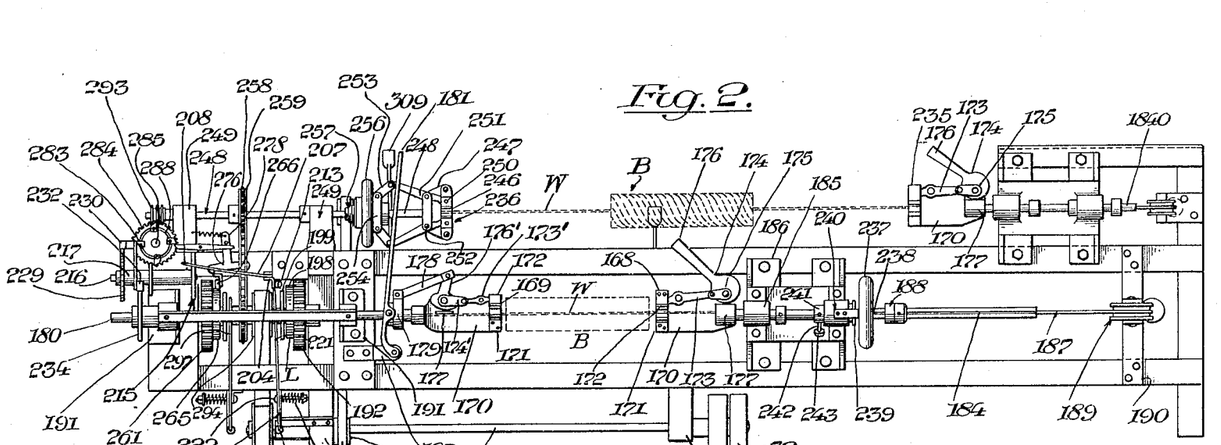
Fig. 2 is a plan of the machine illustrated in Fig. 1.
Figure 3:
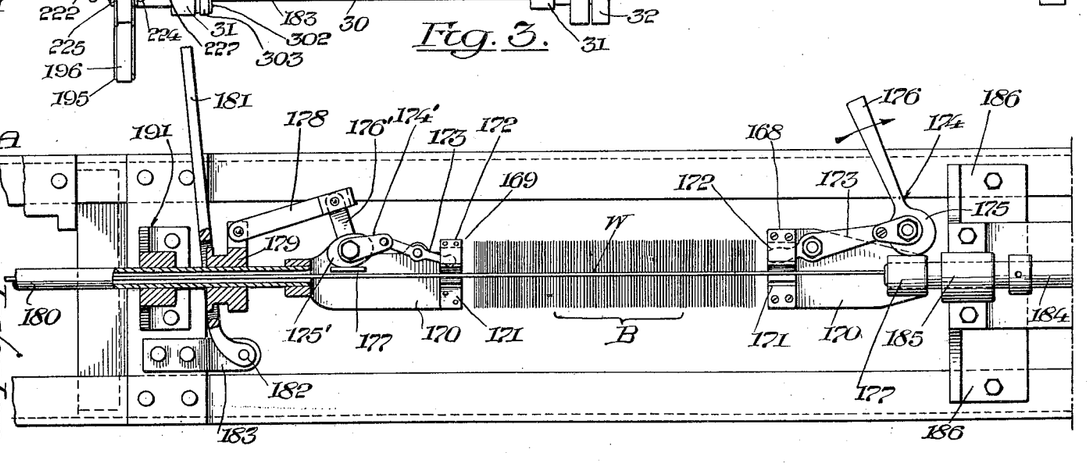
Fig. 3 is a partial plan, enlarged, showing partly in section the wire supporting and main twisting mechanism, together with associated wires and bristles preparatory to the first twisting operation.
Figure 4:
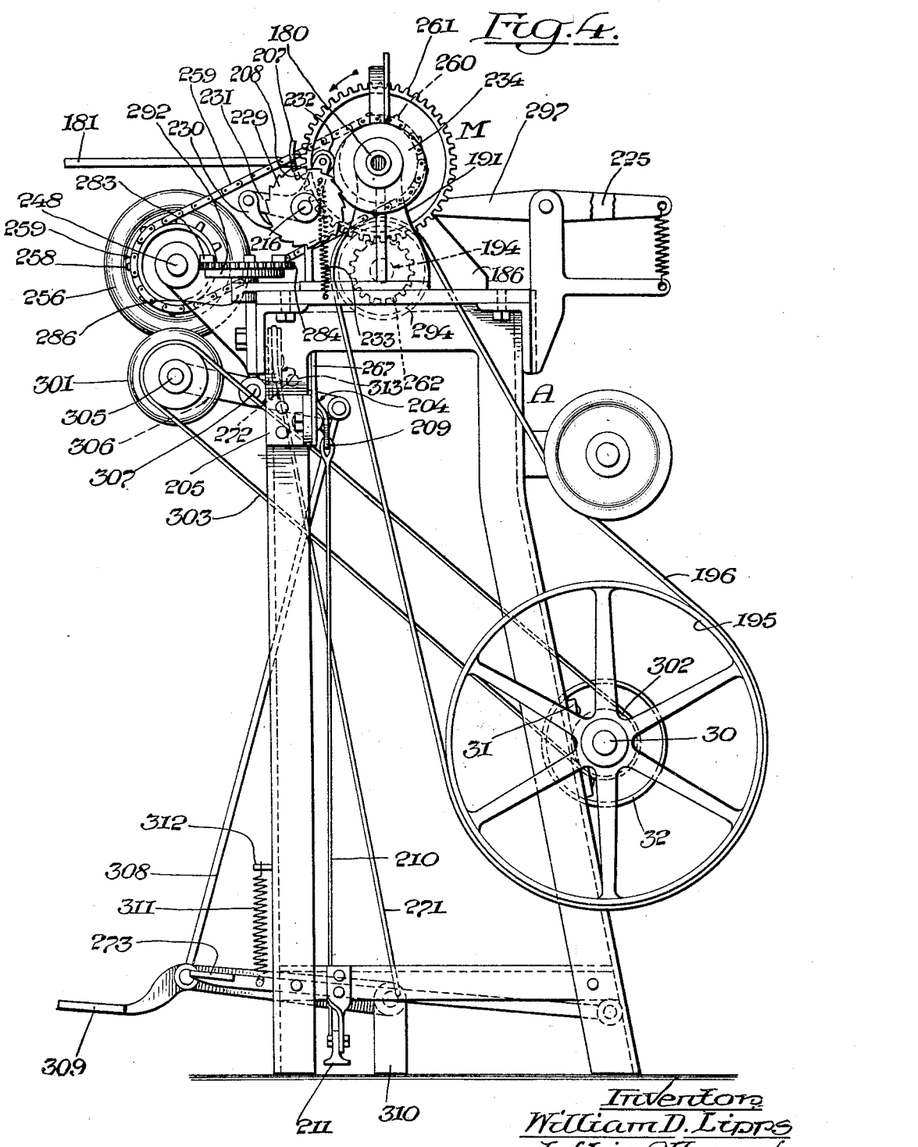
Fig. 4 is an end elevation of the machine illustrated in Fig. 1.
Figure 5:
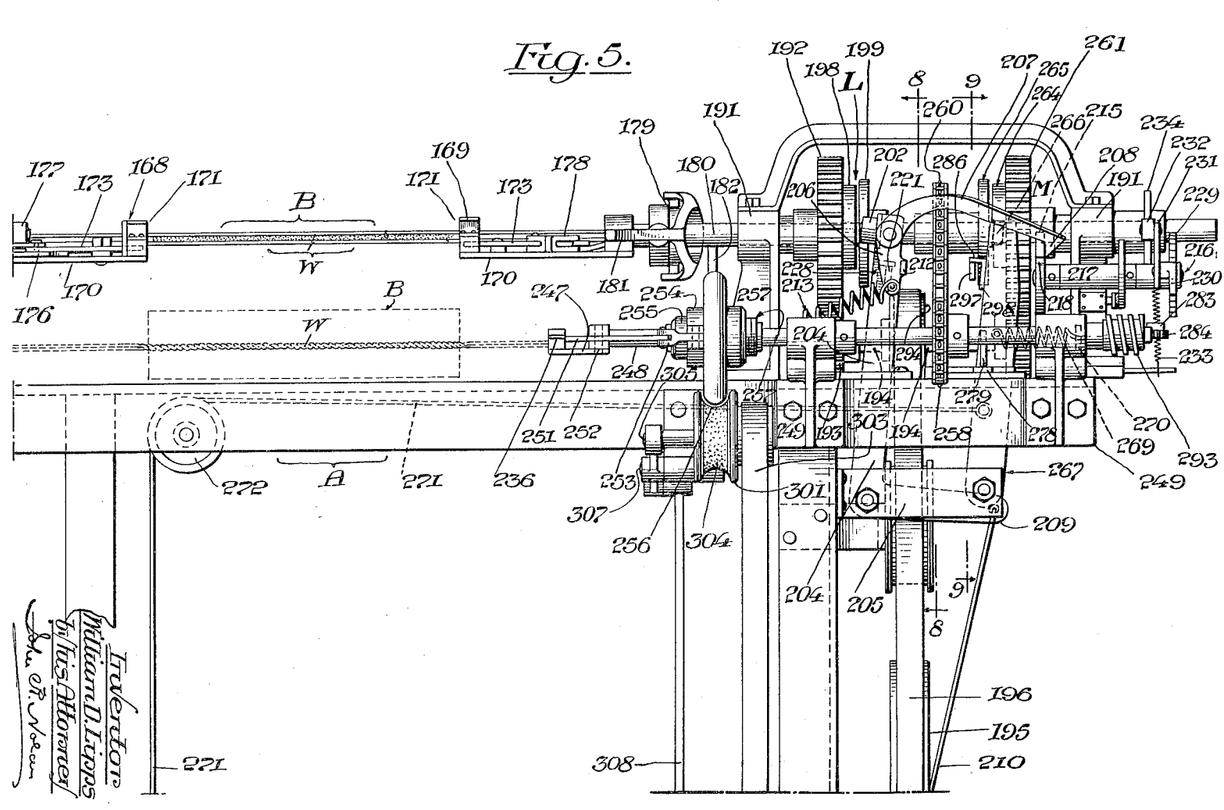
Fig. 5 is a partial rear elevation of the machine.

The base plate 170 of the gripper 168 is affixed to one end of a horizontal spindle 184 having its bearings in spaced brackets 185, supported by a suitable supplemental frame 186 superposed on the main frame. The spindle 184, with its appurtenances, is normally urged in a direction toward the adjacent end of the main frame by means of a weighted cable 187. (See Figs. 1, 2 and 3.)

The cable is secured to a collar 188 fast on the spindle 184 and passes about and depends from a pulley 189 mounted in brackets 190 on the main frame, the weight being secured to the pendant end of the cable.

On the spindle 184 is a hand wheel 237 by means of which the spindle can be partially turned manually when the fibres have been positioned between the core wires and the wires clamped at their ends by the respective grippers 168 and 169, thus partially twisting the wires and the interposed fibres to prevent the displacement of the fibres when the gripper 169 is initially rotated to twist the wires.

In the present instance the wheel 237 is slidably keyed on the spindle 184, as at 238, and is provided with a peripherally grooved hub 239 with which freely engages the depending member of an angle piece 240 secured to the adjacent bearing bracket 185. Thus the hand wheel can be manipulated initially to turn the spindle 184, yet permit the longitudinal movement of the latter during the twisting operation. The spindle 184 has secured thereto a collar 241 having a radial stud 242 provided at its extremity with a roller 243 which, impinging against the top of the frame 186 at the respective sides of the spindle 184, limits the range of rotative movement of the spindle preparatory to the main twisting operation. The wheel 237 is locked in position during this operation by means of a spring latch 244 which is secured to the adjacent part of the supplemental frame 186 so as to engage a suitably located peripheral notch 245 in the wheel. (See Figs. 1, 2, 11 and 12.)

The clutch L hereinbefore referred to includes a ratchet member 197 fast on the hub of the gear 192, and a clutch lever 198 pivoted on a disk 199 fast on the spindle adjacent the ratchet member. The shorter arm of the clutch lever is provided with a tooth 200 which is normally held in engagement with an opposing tooth of the ratchet by means of a spring 201 which is secured to the disk and arranged to press against the longer arm of the lever.

The free end of the longer arm of the lever projects beyond the periphery of the disk and is adapted, when the gear 192 has made a predetermined number of rotations, to encounter a roll 202 which is arranged and adapted to be moved laterally into the path of the projecting lever arm in a manner to disengage the clutch lever from the ratchet member 197, thus unclutching the gear 192 from the spindle 180.

The roll 202 is mounted on a laterally projecting lug 203 adjacent the upper end of the vertical arm 204 of a bell-crank which is pivoted at its lower end on a bracket 205 at one side of the main frame. Pivoted on the upper end of the arm 204 is the depending member 206 of a longitudinally-disposed latch arm 207 at the free end of which is a bevelled tooth portion 208.

The horizontal arm 209 of the bell-crank is connected by means of a cable 210 to a treadle 211 suitably located at the bottom of the main frame.

The depending member 206 of the latch arm 207 has a suitably-disposed lug or projection 212 which, when the member is moved toward the clutch by the action of a suitable spring 213 connecting such member with a pin 214 on the main frame, abuts against the vertical arm 204 of the bell-crank, thus similarly moving the arm and shifting the roll 202 thereon into the path of the clutch lever 198. The roll is latched in retracted position upon the periphery of the disk 199, against the force of the spring 213, by the engagement of the latch tooth 208 with the peripheral edge of an intermittently rotatable latch disk 215 fast on one end of a short horizontal shaft 216 having its bearing in a bracket 217 on the main frame. This disk has in its periphery a radial notch 218 so disposed that when the disk in its intermittent travel makes a complete rotation, the notch aligns with the tooth of the latch arm, thus freeing the arm and permitting its instant projection by the action of the spring 213, the roll being moved into the path of the clutch lever to effect the release of the rotating gear.

When it is desired to remove the roll from the path of the clutch lever 198 and permit the re-engagement of the lever with the complementary clutch member 197 on the gear 192, the treadle 211 is depressed, thus moving the latch arm toward and into engagement with the periphery of the latch disk 215.

Figures 8, 9, 10:
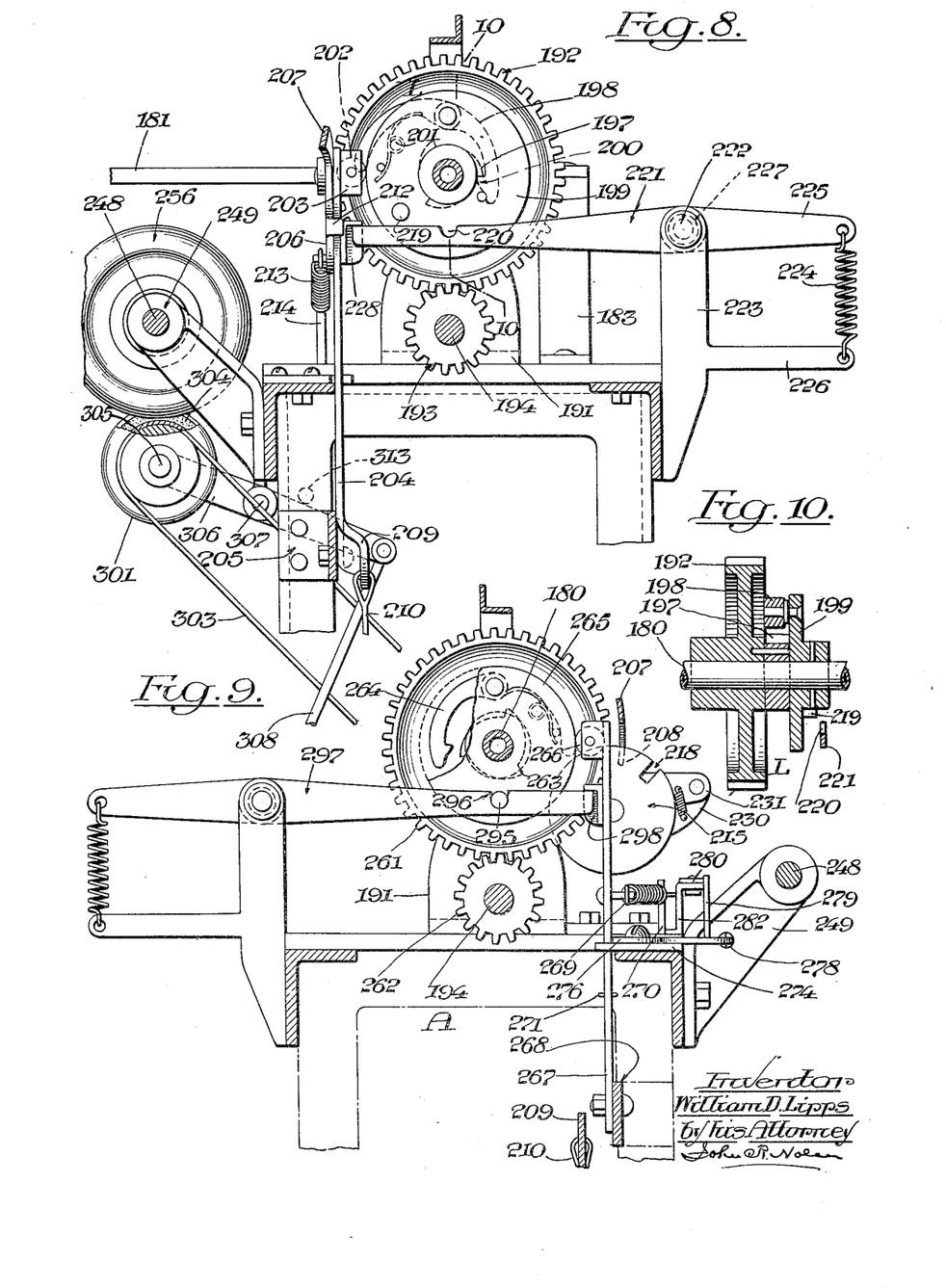
Fig. 8 is a transverse vertical section, as on the line 8—8 of Fig. 5, showing gear and clutch mechanism for the rotatable gripper spindle of the main twisting mechanism.
Fig. 9 is a similar section, as on the line 9—9 of Fig. 5, showing gear and clutch mechanism on the said spindle for controlling the operation of the rotatable spindle of the supplemental twisting mechanism.
Fig. 10 is a partial section through the clutch, and adjuncts, as on the line 10—10 of Fig. 8.
Figure 11:
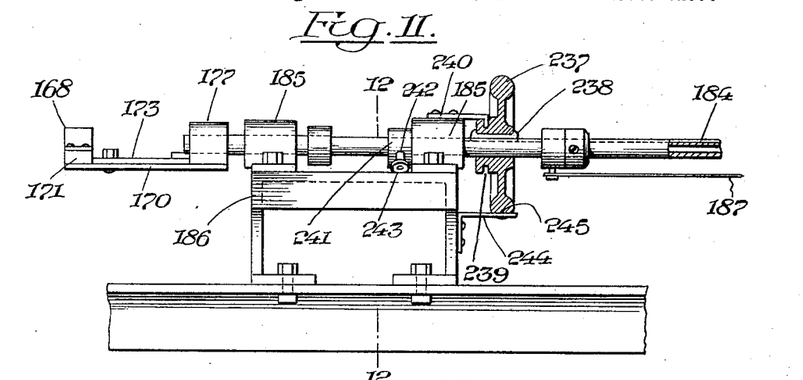
Fig. 11 is a side elevation, partly in section, of the slidable gripper devices of the main twisting mechanisms.
Figures 12, 13:
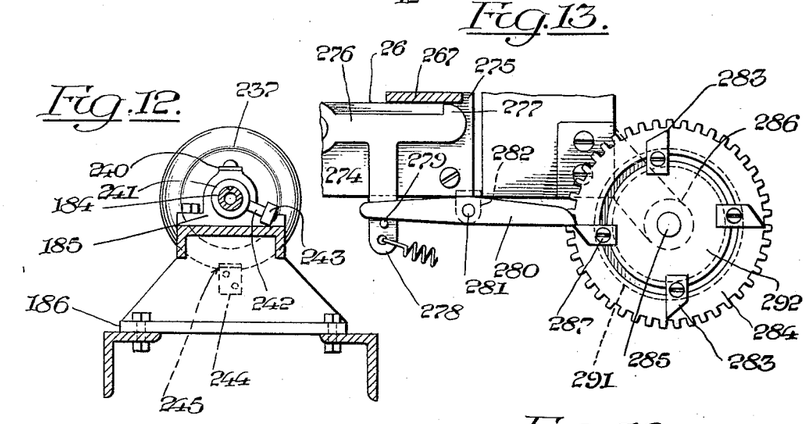
Fig. 12 is a transverse vertical section, as on the line 12—12 of Fig. 11.
Fig. 13 is a plan of a tappet wheel and latch actuating lever for automatically controlling the operation of the clutch mechanism for the supplemental twisting mechanism.
Figures 14, 15:
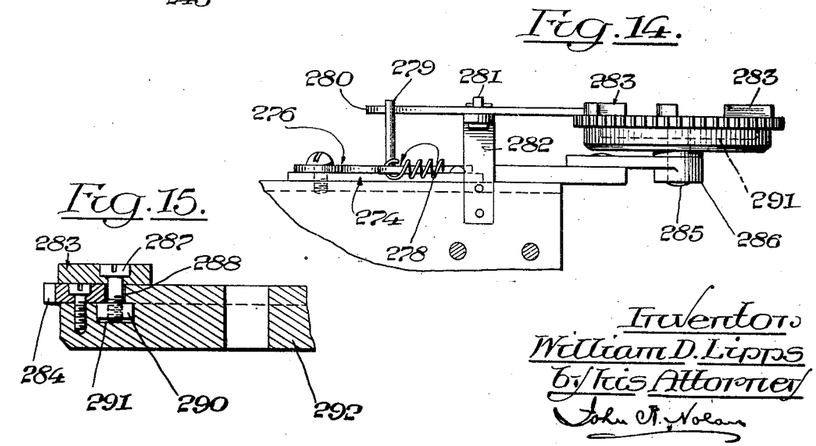
Fig. 14 is a side elevation of the clutch controlling devices shown in Fig. 13.
Fig. 15 is a sectional detail of one side of the tappet wheel, showing an adjustable tappet thereon.

To prevent rotation of the spindle 180 and retain the gripper 169 in proper wire-receiving position when the gear 192 is unclutched, the hub of the clutch disk 199 is provided with a laterally-projecting stud 219 adapted to engage a suitably-disposed notch 220 in the longer arm 221 of a horizontal lever which is pivoted, as at 222, on a post 223 on the main frame. A spring 224 connecting the shorter arm 225 of the lever with a rearwardly projecting member 226 on the post 223, maintains the longer arm normally raised, so that as the gear 192 approaches the limit of its rotation the stud rides upon and depresses the arm 221 until the stud 219 reaches the notch, whereupon the arm 221 snaps upward and engages its notch with the stud. (See Fig. 8.)

Figure 6:
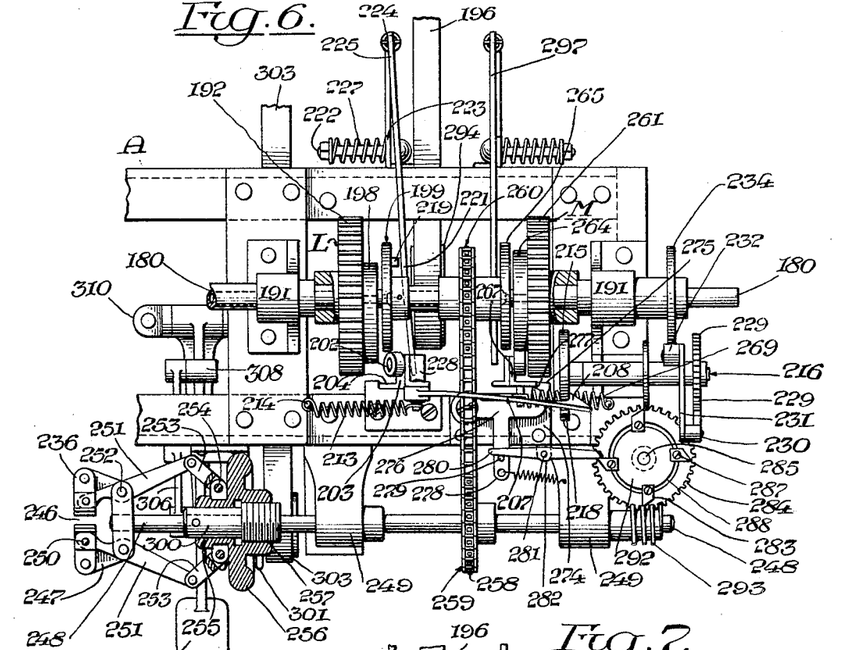
Fig. 6 is a plan, partly in section, of one end of the machine, showing the devices for operating the gripper spindles of the respective twisting mechanisms.
Figure 7:
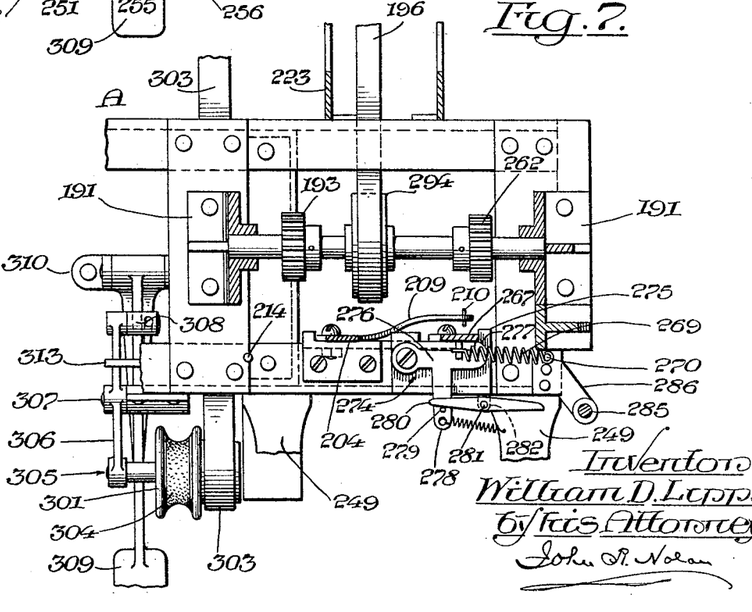
Fig. 7 is a horizontal section, as on the line 7—7 of Fig. 1, showing a continuously driven shaft and its gears for operating the said gripper spindles, and also showing controlling devices for the clutches on the main gripper spindle.

The pivot pin 222 for the notched lever is extended, as seen most clearly in Fig. 6, and a spring 227 is interposed between the head of the pin and the opposing side of the lever, thus permitting resilient lateral movement of the lever. The longer arm of the lever extends laterally adjacent a lug 228 on the vertical arm 204 of the bell-crank, and hence when the bell-crank is actuated to effect the removal of the roll 202 from the path of the clutch lever 198 and coincidentally engage the latch tooth 208 with the periphery of the latch disk 215, the lug 228 presses the opposing lever arm 221 laterally, thus disengaging the retaining notch 220 of the arm 221 from the stud 219 on the disk 199.

The means herein illustrated for intermittently actuating the latch disk 215 in timed relation to the twisting cycle is as follows:

Fast on the outer end of the shaft 216 is a ratchet wheel 229 having a prescribed number of equally-spaced teeth, with which is adapted to engage a spring-pressed pawl 230 on one arm of a bell crank-lever 231 loose on the shaft 216. On the other arm of the lever 231 is a roll 232 which is held by means of a suitably-disposed spring 233 (Figs. 4 and 5) in operative contact with a cam 234 fast on the spindle 180, the peripheral contour of the cam being such that in each rotation of the spindle 180 the pawl lever 231 is oscillated in a manner to advance the ratchet wheel a distance of one tooth, thus correspondingly moving the shaft 216 and the latch disk 215. Assuming the latch arm 207 be engaged with the latch disk and the gear 192 clutched to the spindle 180, such gear and the shaft will make one complete rotation during each step of the latch disk, and hence the number of steps of the latch disk before its notch 218 registers with and effects the release of the tooth of the latch arm 207 will determine the number of rotations of the gear 192 and its spindle 180 to which the ratchet disk 199 of the clutch L is secured.

During the fibre assembling operation, the operator places a wire W in the respective wire grippers 168, 169, positions the layer of fibres on the wire, and places upon the layer another wire which is seated in the wire grippers. He then closes and locks the wire grippers on the wires. He then partially turns the hand wheel 237, thus similarly turning the spindle 184 and the wire gripper 168, so as partially to twist the wires and the interposed layer of fibres. He then presses on the treadle 211, thereby actuating the bell crank 204, 209 and effecting the engagement of the tooth of the latch arm 207 with the intermittently-rotating latch disk 215, and coincidentally moving the roll 202 out of the path of the lever 198 of the clutch L, thus connecting the continuously rotating gear 192 to the spindle 180. Consequently the rotation of the spindle and its wire gripper 169 is commenced and continued until the latch arm 207 is released at the notch of the disk 215, as previously explained.

Upon the stopping of the rotating spindle and its gripper, the operator removes the brush from the wire grippers, and proceeds as before for the production of another brush, and so on.

In the production of a brush wherein the core wires project a short distance beyond the respective ends of the brush body, the ends of the wires which embrace the layer of fibres are seated and clamped in the respective wire grippers and the twisting of the wires throughout their length is effected initially by the partial rotation of the gripper 168 and then by the continuous rotation of the gripper 169 as hereinbefore described.

In the case of a brush wherein the core wires project a substantial distance beyond either or both ends of the brush body, to form a long tang or tangs, the operator enters one end of the wires in the tubular spindle 180 a suitable distance and properly positions the opposite end of the wires in the wire gripper 168 as determined by the desired length of the projecting tang. Hence when the wires are clamped by the wire grippers and the gripper 169 is rotated, the portions of the wires between the grippers containing the layer of fibres are tightly twisted, while the projecting end portions of the wires remain untwisted.

Means to effect the twisting of the projecting ends of the core wires is as follows:

235, 236 designate two supplemental grippers which are located at the front of the machine, in spaced endwise relation, to receive and grip the extremities of the untwisted extensions of the wire core.

The wire gripper 235 and its supporting parts, together with the weighted cable connection, are similar in all respects to the gripper 168 previously described, excepting that the spindle 1840, corresponding to the spindle 184, is simply splined in its bearings to permit its longitudinal movement only, and the hand wheel is therefore omitted.

The wire gripper 236 comprises a pair of complementary jaws 246 slidably mounted on a plate 247 fast on the adjacent end of a longitudinal spindle 248 having its bearings in brackets 249 on the front of the main frame. These jaws are jointed, as at 250, to the shorter arms of a pair of diverging levers 251 which are fulcrumed, as at 252, on the plate 247, the longer arms of the levers being connected by means of links 253 with a yoke 254 which is rotatably supported on the hub portion 255 of a hand wheel 256. This wheel is threaded, as at 257, on a sleeve 300 fast on the spindle, and hence when the wheel is rotated it travels on the sleeve to the right or left, according to the direction of rotation of the wheel, thereby correspondingly advancing or retracting the yoke in a manner to actuate the levers 251 to close or open the jaws 246, thus gripping or releasing the ends of the wires as desired. The rounded periphery of the hand wheel is adapted to be engaged by the groove of a pulley 301 which is connected with and continuously driven from a pulley 302 on the main shaft 30 by means of a belt 303. The wall of the pulley groove is preferably lined with frictional material, such as leather 304. The pulley 301 is slidably mounted on a stud shaft 305 supported on one arm of a lever 306 which is fulcrumed, as at 307, on the front of the main frame, the other arm of the lever being connected by means of a link 308 with a treadle 309, which is pivoted on a suitably disposed floor bracket 310. A spring 311 connected at its ends to the treadle and to a stud 312 on the main frame maintains the treadle normally raised and the pulley 301 out of operative engagement with the hand wheel 256. A suitably-disposed stop 313 against which the lever abuts limits the downward movement of the pulley 301. (See Figs. 2, 4, 6, 7 and 8.)

By depressing the pedal 309 the pulley 301 is raised into frictional contact with the periphery of the hand wheel 256, thus rotating the wheel in a manner to advance it a sufficient distance on the threaded sleeve 300 to close the jaws 246 and grip the ends of the associated wires. The pulley being slidable on its shaft advances with the hand wheel. This done, the pedal is released, and the drive pulley 301 is withdrawn from contact with the wheel 256 and idly rotates, whereupon the spindle 248 and the gripper are rotated by mechanism hereinafter described in a manner to effect the final twisting of the ends of the wires. Immediately upon the termination of this twisting operation the rotation of the spindle is stopped, and the jar resulting from the abruptness of the stoppage effects the release of the hand wheel on the threaded sleeve sufficiently to cause the jaws to open slightly and free the gripped end of the wires. The operator then manually turns the hand wheel 256 to its original position so as to open the jaws 246 for the reception of the wires in the next end twisting operation.

The spindle 248 is provided with a sprocket 258 fast thereon, which sprocket is connected by means of a chain 259 with a sprocket 260 loose on the hollow spindle 180 which carries the wire gripper 169. By means of suitable clutch mechanism M the sprocket 260 may be rendered fast or loose on a gear 261 loose on the spindle 180, which gear meshes with and is continuously driven by a pinion 262 fast on the shaft 194.

The clutch mechanism herein shown is as follows:

Fast on the hub of the gear 261 is a ratchet member 263 with which is adapted to engage the toothed end of a spring-pressed clutch lever 264 that is pivoted on a disk 265 carried by and turning with the sprocket 260. The roll 266 for disengaging the clutch lever is mounted on the upper end of a rock arm 267 the lower end of which is pivoted on the bracket 205 adjacent the bell-crank lever 204. A spring connection 269 between the arm and a pin 270 on the main frame tends to maintain the arm in position with the roll in the path of the clutch lever. A cable 271 passing about a suitably-disposed sheave 272 on the main frame connects the arm 267 with a treadle 273 mounted on a lower extension of the frame. (See Figs. 1, 2, 4, 5 and 9.) When the treadle is depressed the roll 266 is swung from the clutch lever against the action of the spring and rests on the face of the disk, the lever thus engaging the ratchet and locking the gear 261 to the disk 265 and sprocket 260. Hence the sprocket is rotated and the motion is transmitted to the spindle 248. The lever is latched in this position until the final twisting operation has been completed, whereupon the lever is released and moved to position the roll in the path of the clutch lever in order to disconnect the gear 261 from the spindle 180 and thus stop the rotation of the spindle 248 and its wire gripper; it being remembered that such stopping automatically releases the hand wheel 256 on the threaded sleeve 300 of the spindle 248 and effects the opening of the gripper jaws 246 and the release of the twisted ends of the core wires gripped thereby.

The lever latching mechanism is as follows: 274 is a plate which is fixed to the main frame adjacent the rock arm 267 and is provided at one end with a shoulder 275 which affords a stop for such arm when it is in clutch-lever engaging position. Pivoted on the opposite end of the plate is a spring-controlled latch lever 276 having a shoulder 277 which is moved into engagement with the arm 267 when the latter is swung to clutch-lever releasing position by actuation of the treadle 273, thus temporarily locking the arm in that position. (See Figs. 5, 6, 7 and 9.) When the final end twisting operation is completed the latch-lever 276 is automatically disengaged from the arm 267 as follows:

The latch lever has an outwardly projecting arm 278 provided with an upstanding stud 279 against which bears one arm of a lever 280 which is fulcrumed, as at 281, on a bracket 282 at the front of the main frame. The other arm of the lever extends into the path of a series of spaced tappets 283 on the face of a horizontally disposed worm wheel 284 which is loosely mounted on a stud shaft 285 projecting from a bracket 286 on the top of the main frame. The tappets are independently adjustable relatively to each other, and to this end each tappet is firmly clamped against the face of the worm wheel by means of a screw 287 which passes through an annular opening 288 in the wheel and is threaded in a block 290 seated in an annular groove 291 in a backer wheel 292 to which the worm wheel is fastened. (See Figs. 2, 6, 13, 14 and 15.)

The worm wheel 284 meshes with a worm 293 on the outer end of the spindle 248, and hence the wheel is moved with the spindle during the end twisting operation. The tappets are so disposed that at the end of each twisting operation a tappet bears against the opposing arm of the lever 280 and forces it inward. As the other arm is swung outward it bears against the stud 279 on the arm 278 of the latch lever 276 and moves the latch to release the rock arm 267, which arm swings laterally against the stop 275 on the plate 274, for the purpose previously described. The tappets 283 are in such spaced relation on the worm wheel as to act consecutively upon the lever 280 at the termination of each succeeding end twisting operation.

To prevent rotation of the gear 261 and to ensure the proper wire-receiving position of the wire gripper 236 when such gear is unclutched, suitable stop devices such as hereinbefore described with respect to the gear 192 on the spindle 180 are provided; that is to say, the disk 265 has a laterally-projecting stud 295 which engages the notch 296 of a spring-controlled lever 297 as the gear 261 approaches the limit of its rotation. When the rock arm 267 is moved to swing the roll 266 from the path of the clutch lever 264, a lug 298 on the arm 267 pushes the lever 297 laterally and disengages its notch from the stud 295 on the disk 265. (See Figs. 5 and 9.)

The two twisting mechanisms hereinbefore described are operated simultaneously so that when the wires and fibres for one brush have been associated and are being twisted together by and between the wire grippers 168, 169, the extending ends of the twisted wires of a previously formed brush body may be twisted by and between the wire grippers 235, 236 of the supplemental twisting mechanism, it being understood, of course, that the operator places and clamps the wires in the grippers of the respective twisting mechanisms before he operates the devices for clutching the gears 192, 261 to the hollow gripper spindle 180. During this interval a quota of bristles or fibres for a third brush can be assembled preparatory to its association with the core wires.

Since the main or body twisting operation of the core wires occupies a longer period of time than the supplemental or end twisting of the wires the independent clutch and clutch releasing mechanism M to control the variable operative periods of the supplemental twisting mechanism, is employed.

It is to be understood that my invention is not limited to the particular construction disclosed, as the mechanisms may be modified within the principle of the invention and the scope of the appended claims.

I claim—

1. A brush machine comprising main twisting mechanism including a pair of spaced-apart grippers for holding core wires and twisting the bodies thereof longitudinally upon an interposed layer of fibres to provide untwisted end projecting portions of the wires, a rotary supporting element for one of said grippers, a supplemental twisting mechanism including a pair of spaced-apart grippers for receiving the extremities of the twisted core wires and twisting the end extensions of the wires, a rotary supporting element for one of said supplemental grippers, mechanism for simultaneously or independently actuating the said rotary supporting elements and including means for automatically stopping the operation of either of said elements upon the completion of its twisting operation independently of the other element.

2. A brush machine comprising a main twisting mechanism including a pair of spaced-apart grippers for holding core wires and twisting the bodies thereof longitudinally upon an interposed layer of fibres to provide untwisted end projecting portions of the wires, a spindle carrying one of said grippers, a supplemental twisting mechanism including a pair of spaced-apart grippers for receiving the extremities of the twisted core wires and twisting the end extensions of the wires, a spindle for one of said supplemental grippers, positively driven elements loose on the main gripper spindle, transmission means between one of said elements and the supplemental gripper spindle, a clutch between said element and the transmission means, a clutch between the other element and the main gripper spindle, releasing means for the respective clutches, and independent means for automatically actuating said releasing means upon the completion of the respective twisting operations.

3. A brush machine comprising a pair of spaced-apart grippers for holding core wires and twisting the bodies thereof upon an interposed layer of fibres to provide untwisted end extensions of the wires, a hollow spindle carrying one of said grippers, said spindle adapted to receive and support the adjacent end extensions of the twisted wires, a supplemental twisting mechanism including a pair of spaced-apart grippers for subsequently receiving the extremities of the twisted core wires and twisting the end extensions thereof, means including clutch devices for simultaneously or independently rotating the spindles of the respective twisting mechanisms, releasing means for the respective clutches, and independent means for automatically actuating said releasing means upon the completion of the respective twisting operations.

4. A brush machine comprising a pair of spaced-apart wire grippers for holding core wires and twisting the body thereof upon an interposed layer of fibres, said grippers each including a spindle, one of said spindles being rotatable to effect the close twisting together of the wires and fibres, and the other of said spindles partially rotatable to effect an initial twisting of the wires and fibres to prevent displacement of the fibres, and also longitudinally movable within limits to compensate for the contracting of the wires during the close twisting operation, means for temporarily locking the latter spindle at the limit of its partial rotation, and means tending to maintain said latter spindle yieldingly at the outer limit of its longitudinal movement.

5. A brush machine comprising a pair of spaced-apart grippers including gripper jaws for receiving and twisting the untwisted end extensions of twisted core wires, a spindle for rotating one of said grippers, a hand wheel having a threaded connection with said spindle, jaw operating connections between said wheel and the jaws of the adjacent gripper, means for independently rotating said wheel to effect the closure of the said jaws, mechanism for rotating said spindle, and means for automatically stopping said spindle upon the completion of the twisting operation.

6. A brush machine comprising a pair of spaced-apart grippers including gripper jaws for receiving and twisting the untwisted end extensions of twisted core wires, a spindle for rotating one of said grippers, a hand wheel having a threaded connection with said spindle, jaw operating connections between said wheel and the jaws of the adjacent gripper, means for independently rotating said wheel to effect the closure of the said jaws, mechanism for rotating said spindle, and means for automatically stopping said spindle upon the completion of the twisting operation, said last-named means including a rotary tappet element and operative connection between said element and the spindle.

Signed at Frederick, in the county of Frederick and State of Maryland this 29th day of June, A. D. 1932.

WILLIAM D. LIPPS.